US009506409B2

(12) United States Patent
Ten Broeke et al.

(10) Patent No.: US 9,506,409 B2
(45) Date of Patent: Nov. 29, 2016

(54) METHOD OF SWITCHING FROM A LIQUEFIED GAS FUEL TO A LIQUID FUEL BEING PROVIDED TO A DIRECT INJECTION COMBUSTION ENGINE, AND DIRECT INJECTION BI-FUEL SYSTEM FOR SUCH AN ENGINE

(75) Inventors: Sebastiaan Martinus Emanuel Ten Broeke, Nijnsel (NL); Jeroen Visscher, Herwen (NL)

(73) Assignee: INDOPAR B.V., Eindhoven (NL)

( * ) Notice: Subject to any disclaimer, the term of this patent is extended or adjusted under 35 U.S.C. 154(b) by 448 days.

(21) Appl. No.: 14/127,346

(22) PCT Filed: Jun. 20, 2012

(86) PCT No.: PCT/NL2012/050432
§ 371 (c)(1),
(2), (4) Date: Feb. 6, 2014

(87) PCT Pub. No.: WO2012/177128
PCT Pub. Date: Dec. 27, 2012

(65) Prior Publication Data
US 2014/0311445 A1 Oct. 23, 2014

(30) Foreign Application Priority Data

Jun. 24, 2011 (NL) .................................... 2006992

(51) Int. Cl.
*F02M 21/02* (2006.01)
*F02D 19/06* (2006.01)
*F02B 75/12* (2006.01)

(52) U.S. Cl.
CPC ........... *F02D 19/06* (2013.01); *F02D 19/0621* (2013.01); *F02D 19/0647* (2013.01);
(Continued)

(58) Field of Classification Search
CPC .......................... F02D 19/0642; F02D 19/081
USPC ..................................... 123/27 GE, 304, 525
See application file for complete search history.

(56) References Cited

U.S. PATENT DOCUMENTS 5,379,740 A   1/1995 Moore et al.
5,775,282 A   7/1998 Smith
(Continued)

FOREIGN PATENT DOCUMENTS

DE     101 46 051 A1    10/2002
DE     10146051 B4       3/2004
(Continued)

OTHER PUBLICATIONS

International Search Report for PCT/NL2012/050432 dated Jul. 20, 2012.

*Primary Examiner* — John Kwon
(74) *Attorney, Agent, or Firm* — Shumaker, Loop & Kendrick, LLP

(57) ABSTRACT

A method of switching between liquefied gas fuel and liquid fuel consuming modes of a direct injection combustion engine including pumping liquefied gas fuel to a high pressure, pump for pumping the liquefied gas fuel to a high pressure rail of the engine during the liquefied gas fuel consuming mode, switching to the liquid fuel consuming mode, pumping the liquid fuel to the high pressure pump, flushing liquefied gas fuel via a return line between the high pressure pump and a fuel tank, controlling pump operation, controlling flow through the return line, and controlling the pressure of the fuels.

12 Claims, 7 Drawing Sheets

(52) U.S. Cl.
CPC ..... *F02D19/0684* (2013.01); *F02B 2075/125* (2013.01); *F02D 19/0689* (2013.01); *F02D 19/0694* (2013.01); *Y02T 10/123* (2013.01); *Y02T 10/36* (2013.01)

(56) References Cited

U.S. PATENT DOCUMENTS

| | | | |
|---|---|---|---|
| 6,035,837 | A | 3/2000 | Cohen et al. |
| 6,491,017 | B1 | 12/2002 | Mahr et al. |
| 6,494,190 | B1 | 12/2002 | Cohen |
| 6,711,893 | B2 | 3/2004 | Ueda et al. |
| 6,814,057 | B2 | 11/2004 | Mahr et al. |
| 6,923,168 | B2 | 8/2005 | Bryde |
| 8,051,828 | B2 | 11/2011 | Sengupta et al. |
| 8,100,110 | B2 | 1/2012 | Shinogle et al. |
| 8,180,556 | B2 | 5/2012 | Cippitani |
| 8,214,128 | B2 | 7/2012 | Watkins et al. |
| 2008/0035119 | A1 | 2/2008 | Marriott et al. |
| 2008/0245350 | A1 | 10/2008 | Triska |
| 2009/0320786 | A1* | 12/2009 | Fisher ................ F02D 19/0647 123/27 GE |
| 2011/0011369 | A1* | 1/2011 | Jaasma ............... F02D 19/0647 123/304 |
| 2011/0023853 | A1* | 2/2011 | Lund .................. F02D 19/0647 123/590 |
| 2011/0155102 | A1* | 6/2011 | Ten Broeke ........ F02D 19/0605 123/446 |
| 2012/0186560 | A1* | 7/2012 | Lund .................. F02D 19/0642 123/495 |

FOREIGN PATENT DOCUMENTS

| | | |
|---|---|---|
| DE | 102006001616 A1 | 7/2007 |
| DE | 202008002939 U1 | 7/2008 |
| DE | 10 2008 024 561 A1 | 11/2009 |
| EP | 1293654 A2 | 3/2003 |
| EP | 1785618 B1 | 1/2009 |
| EP | 2 143 916 A1 | 1/2010 |
| EP | 2 341 234 A2 | 7/2011 |
| FR | 2902147 A1 | 12/2007 |
| JP | 2002327658 A | 11/2002 |
| WO | 02063158 A1 | 8/2002 |
| WO | 2004097196 A1 | 11/2004 |
| WO | 2009081441 A1 | 7/2009 |
| WO | 2009098728 A1 | 8/2009 |
| WO | 2009110792 A1 | 9/2009 |
| WO | 2011/059316 A1 | 5/2011 |

* cited by examiner

METHOD OF SWITCHING FROM A LIQUEFIED GAS FUEL TO A LIQUID FUEL BEING PROVIDED TO A DIRECT INJECTION COMBUSTION ENGINE, AND DIRECT INJECTION BI-FUEL SYSTEM FOR SUCH AN ENGINE

TECHNICAL FIELD AND BACKGROUND OF THE INVENTION

The present invention is related to a direct injection bi-fuel system for a combustion engine that is configured to separately provide fuel from two sources. In particular, the system is a direct injection bi-fuel system configured to separately provide two types of fuel, being liquid fuel and liquefied gas fuel, as desired, to a combustion engine.

Direct injection fuel systems are configured to inject fuel directly into a cylinder of a combustion engine instead of premixing the fuel with air in separate intake ports. This configuration allows for controlling combustion and emissions more precisely, but it demands more advanced engine management technologies. The higher torque provided by modern direct injection gasoline engines is the result of the synergistic effect of direct injection, charging, and variable valve timing. In combination, these aspects of direct injection technology allow for great flexibility in the engine tuning. As a result, there tends to be a superior cylinder charge with a reduced tendency to knock.

In the automotive industries, the direct injection technology for petrol, or gasoline, has already been introduced for several engine types. This means that the common existing liquefied petroleum gas ("LPG") technology has to be changed or improved or completely redesigned in order to be utilized along with the existing direct injection technology for petrol.

There are at least two options to use LPG for direct injection engines. First, provide indirect LPG injection through port injection, and second, provide direct LPG injection into the burning chamber. The indirect LPG injection system is mainly based on the existing master slave sequential injection that is also used for indirect injection engines. The direct LPG injection system is a new system that is still in development. When using the direct injection technology with LPG, the advantages for environment may be obtained through reduction of carbon dioxide and particles into the atmosphere.

In normal operation, the direct injection combustion engine uses a high pressure fuel pump, high pressure fuel rail, and direct injectors to directly inject the fuel into the combustion chamber. To reduce cost and overall system complexity, it is desirable to use the high pressure components for both types of fuel. To make this possible, the system should be able to replace the first type of fuel with the second type of fuel and vice-versa.

There are physical challenges that may occur when switching between two types of fuel. First, when replacing one fuel with another fuel during engine operation, undesirable mixing can occur. Second, when the system is using liquefied gas fuel as one type of fuel and liquid fuel as the other type of fuel, depending on gas composition and temperature, it is possible that the pressure of the liquefied gas system will operate at a higher pressure than the liquid fuel system.

BRIEF SUMMARY OF THE INVENTION

It is an aspect of the present invention to provide a direct injection bi-fuel system that can provide a liquid type of fuel and a liquefied gas type of fuel, as desired, to a combustion engine.

According to an embodiment of the present invention, there is provided a direct injection bi-fuel system that includes a liquid fuel subsystem and a liquefied gas fuel subsystem. The liquid fuel subsystem includes a liquid fuel tank configured to hold a supply of liquid fuel, and a liquid fuel pump configured to pump the liquid fuel out of the liquid fuel tank. The liquefied gas fuel subsystem includes a liquefied gas fuel tank configured to hold a supply of liquefied gas fuel, and a liquefied gas fuel pump configured to pump the liquefied gas fuel out of the liquefied gas fuel tank. The direct injection bi-fuel system includes a junction configured to receive liquid fuel from the liquid fuel subsystem when the system is operating in a liquid fuel consuming mode, and to receive liquefied gas fuel from the liquefied gas fuel subsystem when the system is operating in a liquefied gas fuel consuming mode, a high pressure pump configured to receive the fuel passing through the junction and pump the fuel to a high pressure rail of a direct injection combustion engine, and it may comprise liquid fuel boosting means configured to flush the liquefied gas fuel from the fuel supply to the high pressure pump responsive to the system being switched from the liquefied gas fuel consuming mode to the liquid fuel consuming mode. The boosting means may be in the form of a purging unit including a piston and being configured to receive the liquefied gas fuel on one side of the piston and the liquid fuel on the other side of the piston. The boosting means may alternatively be in the form of a purging unit including a piston and being configured to receive the liquid fuel on one side of the piston and also the liquid fuel on the other side of the piston, the operative surfaces on both sides of the piston being mutually different. The boosting means may alternatively be in the form of a boost pump configured to receive fuel from the liquid fuel pump and increase the pressure of the liquid fuel being provided to the junction to flush the liquefied gas fuel from the fuel supply to the high pressure pump responsive to a switch over from the liquefied gas fuel to the liquid fuel.

It is an aspect of the present invention to provide a method for switching between a liquefied gas fuel, such as liquefied petroleum gas, and a liquid fuel, such as petrol or diesel or gasoline, for a direct injection combustion engine. According to an embodiment of the present invention, there is provided a method of switching from a liquefied gas fuel being provided to a direct injection combustion engine during a liquefied gas fuel consuming mode, to a liquid fuel being provided to the engine during a liquid fuel consuming mode, the method comprising the steps of:

a) pumping a liquefied gas fuel by means of a liquefied gas fuel pump to a high pressure pump which is configured to pump liquefied gas fuel to a high pressure rail of the direct injection combustion engine during the liquefied gas fuel consuming mode;

b) switching from the liquefied gas fuel consuming mode to the liquid fuel consuming mode;

c) pumping a liquid fuel at a pressure at least equal to the vapor pressure of the liquefied gas fuel to the high pressure pump, by means of at least a first liquid fuel pump, wherein liquefied gas fuel is flushed via a return fuel line between the high pressure pump and a fuel tank;

d) stop pumping liquefied gas fuel to the high pressure pump;

e) stop flushing liquefied gas fuel by closing a return valve in the return fuel line;

f) after a predetermined delay after step e) and during the liquid fuel consuming mode, opening the return valve for a predetermined time to flush liquid fuel comprising any residual liquefied gas fuel via the return fuel line; and g) decreasing the pressure of the liquid fuel pumped to the high pressure pump to a pressure lower than the vapor pressure of the liquefied gas fuel.

An advantage of the method according to the present invention is that due to the temporarily opening of the return valve again after the pumping of liquefied gas fuel has been stopped and after the return valve is closed, liquid fuel comprising any residual gas fuel which may be present is flushed, i.e. removed, from the fuel supply to the high pressure pump, including the low pressure region of the high pressure pump, via the return line between the high pressure pump and a fuel tank, in a very effective manner. When this step of the method would not be carried out, in practice there would still be some risk of occurrence of vapor lock due to residual, vaporized, gas fuel present in the system after the purging of the liquefied gas fuel from the system. As a result, the reliability of the engine onto which the method according to the invention is carried out, is significantly increased, since engine stall due to vapor lock is prevented or the chance of occurrence of vapor lock is at least decreased significantly.

When reference is made to the vapor pressure of the liquefied gas fuel within the framework of the present invention, this is to be understood as the (local) vapor pressure of the liquefied gas fuel at the location of the high pressure pump. Due to the relatively high temperature at said location it is important to keep the liquefied gas fuel in the liquid state at that particular location.

Preferably step c) is effected by feeding a liquid fuel by means of the first liquid fuel pump to liquid fuel boosting means, by increasing the pressure of the liquid fuel supplied by the first liquid fuel pump to the boosting means to a pressure at least equal to the vapor pressure of the liquefied gas fuel, and by feeding the liquid fuel at the increased pressure to the high pressure pump with the boosting means. The boosting means are preferably constituted by a boost pump for liquid fuel.

Step f) may in an embodiment be effected by deactivating the boosting means at least to an extent sufficient for pumping the liquid fuel at the decreased pressure to the high pressure pump.

Preferably step g) is carried out simultaneously with the closing of the return valve at the end of step f). In an embodiment step e) may be carried out 1 to 30 seconds, preferably about 5 to 10 seconds, after step d). Preferably the predetermined delay of step f) is in the range of 1 to 180 seconds. Preferably the predetermined delay of step f) is determined in dependence of the fuel consumption of the engine. The predetermined time of step f) may be in the range of 1 to 10 seconds. It is advantageous if the return fuel line is between the high pressure pump and a fuel tank for liquefied gas fuel.

The invention is further related to a direct injection bi-fuel system that comprises a liquid fuel subsystem and a liquefied gas fuel subsystem, wherein the system is adapted for switching from a liquefied gas fuel being provided to a direct injection combustion engine during a liquefied gas fuel consuming mode, to a liquid fuel being provided to the engine during a liquid fuel consuming mode, according to the method according to any one of the preceding claims.

These and other aspects, features, and advantages of the invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE INVENTION

Figure 1:
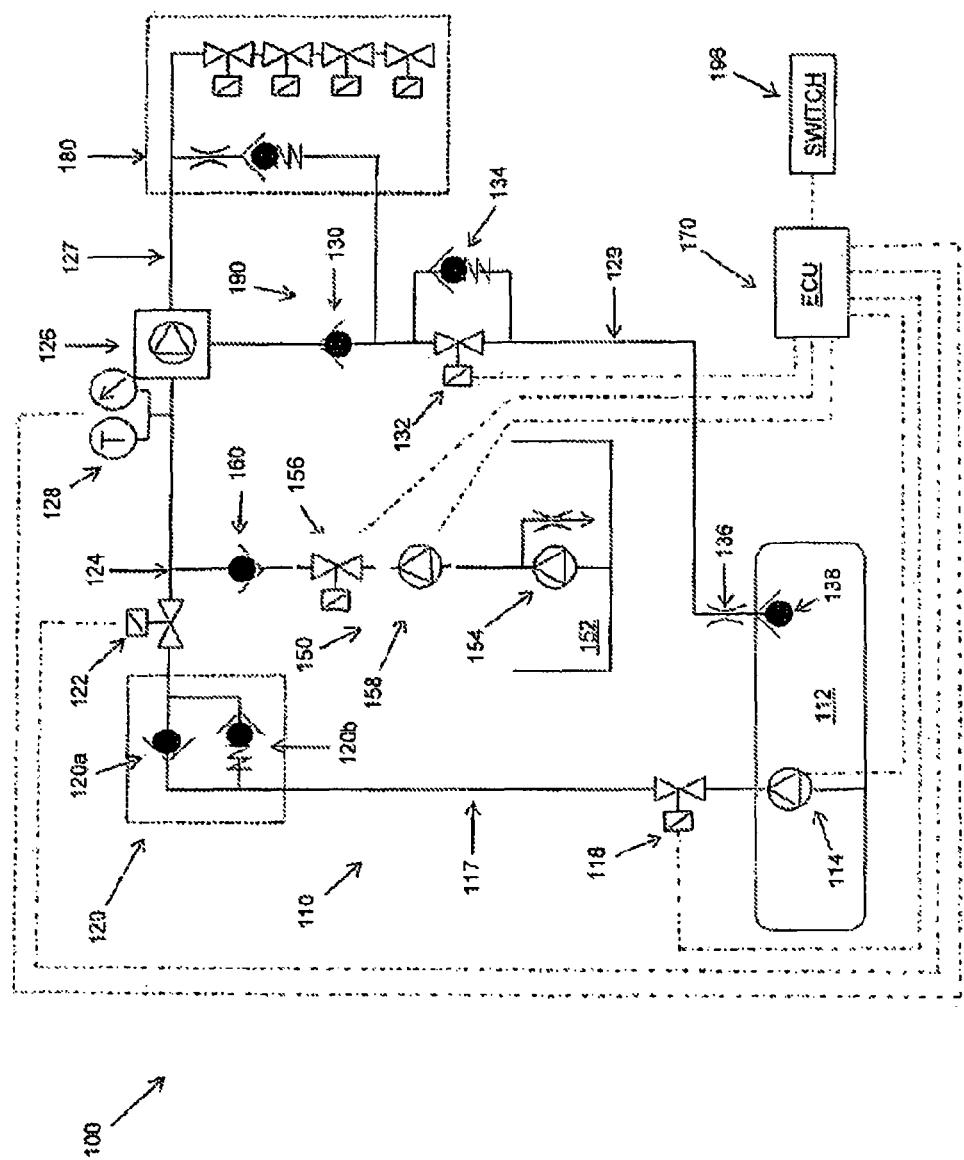
FIG. 1 illustrates an embodiment of a direct injection bi-fuel system for a combustion engine.

FIG. 1 illustrates a direct injection bi-fuel system 100 for a combustion engine according to an embodiment of the present invention. As described in further detail below, the system 100 is configured to switch between two types of fuel being provided to the engine. One of the fuels is a liquid fuel, such as petrol, diesel, or gasoline, and the other fuel is a liquefied gas fuel, such as a liquefied petroleum gas ("LPG"), which may include propane or butane or mixtures thereof.

As illustrated in FIG. 1, the direct injection bi-fuel system 100 includes a liquefied gas fuel subsystem 110 and a liquid fuel subsystem 150, as well as high pressure components that are located between the subsystems 110, 150 and the combustion engine, as described in further detail below.

The liquefied gas fuel subsystem 110 includes a fuel storage tank 112 configured to hold a supply of liquefied gas or vapor fuel, such as LPG. In an embodiment, the pressure of the liquefied gas fuel in the fuel storage tank 112 may be about 2-16 bar. A fuel pump 114 is mounted in the fuel storage tank 112. The fuel pump 114 may be any type of fuel pump that can be configured to remove the liquefied gas from the storage tank 112 via suction and pump the liquefied gas under an elevated pressure, being at least a pressure above the vapor pressure of the liquefied gas fuel, through a fuel supply line 117, through a safety lock-off valve 118, through a pressure limiting non-return valve 120, through a lock-off valve 122, through a junction 124, and to a high pressure fuel pump 126. In a further embodiment, the fuel pump 114 may be mounted outside the fuel storage tank 112.

The pressure limiting non-return valve 120 is depicted in FIG. 1 has a non-return valve 120a and a pressure limiting valve 120b. The non-return valve 120a and the pressure limiting valve 120b may be part of a single integrated valve that performs the functions of a non-return valve and a pressure limiting valve and therefore may together be called a pressure limiting non-return valve 120. The non-return valve 120a is configured to prevent liquid fuel from entering the liquefied gas fuel subsystem 110, and the pressure limiting valve 120b is configured to limit the differential system pressure between the lock-off valve 122 and the non-return valve 120a.

The lock-off valve 122 is configured to prevent liquefied gas fuel from entering the liquid fuel system 150, which may cause undesired mixing and consumption of fuel. The junction 124 joins the liquefied gas fuel subsystem 110 and the liquid fuel subsystem 150 so that the liquefied gas fuel and the liquid fuel may be individually supplied to the high pressure fuel pump 126. In between the junction 124 and the high pressure fuel pump 126 is a (temperature and) pressure sensor 128 that is configured to measure the (temperature and the) pressure of the fuel being supplied to the high pressure fuel pump 126. In an embodiment, a second pressure (and temperature) sensor (not shown) may be provided on the fuel storage tank 112 and be configured to measure the pressure (and temperature) of the fuel in the fuel storage tank 112.

The high pressure fuel pump 126 is connected to a high pressure fuel line 127 and is configured to pump the fuel, whether the fuel is liquid fuel or liquefied gas fuel, at an elevated pressure to a high pressure fuel rail and fuel injectors, collectively designated as 180 in FIG. 1, of a direct injection combustion engine. The pressure of the fuel in the high pressure rail may be in the range of about 20 bar to about 200 bar, or more. Although FIG. 1 schematically illustrates a four cylinder combustion engine configuration, the engine may include additional cylinders and/or high pressure pumps. The illustrated embodiment is not intended to be limiting in any way.

A liquefied gas fuel return subsystem 190 is connected to the high pressure fuel rail and to the high pressure fuel pump 126 and is configured to provide a return path for the liquefied gas fuel to the fuel storage tank 112 in the event that pressure relief for the high pressure fuel rail 180 or the high pressure fuel pump 126 is needed, and/or if vapor bubbles need to be removed from the supply of the liquefied gas fuel. The liquefied gas fuel return subsystem 190 includes a non-return valve 130 that is configured to prevent liquefied gas fuel from entering the high pressure fuel pump 126 by a return fuel line 129, and a return valve, in the present embodiment in the form of a lock-off valve 132, that is configured to prevent liquid fuel from entering the liquefied gas fuel subsystem 110 when the liquid fuel is being supplied to the combustion engine, which may cause undesirable mixing and consumption of fuel. A pressure limiting valve 134 is configured to limit the differential system pressure between the lock-off valve 132 and the non-return valve 130.

Any liquefied gas fuel that is returned from the high pressure components of the system, such as the high pressure fuel pump 126 and the high pressure fuel rail, flows through the return fuel line 129, through a restriction 136, through a non-return valve and into the fuel storage tank 112, as illustrated in FIG. 1. The pressure of the liquefied gas fuel that is returned to the fuel storage tank is typically in between the pressure of the liquefied gas fuel in the fuel storage tank 112 and the pressure of the liquefied gas fuel that is supplied from the high pressure fuel pump 126 to the high pressure fuel rail 180.

A non-return valve 138 is provided at the fuel storage tank 112 and is configured to prevent fuel leakage in case of damage to the liquefied gas fuel subsystem 110. The restriction 136, which may be a fixed or variable restriction, is configured to control the elevated system pressure by the flow through the fuel pump 114. The pressure increase in relation with the fuel storage tank 112 may be within the range of between about 2 bar and about 10 bar.

The liquid fuel subsystem 150 includes a fuel storage tank 152 configured to hold a supply of liquid fuel, such as gasoline, petrol, or diesel. A fuel pump 154 is mounted in the fuel storage tank 152 and is configured to remove the liquid fuel from the fuel storage tank 152 via suction and pump the liquid fuel, through a lock-off valve 156. Any suitable fuel pump, mounted inside or outside the fuel storage tank 152, may be used to pump the liquid fuel from the fuel storage tank 152 through the lock-off valve 156. The lock-off valve 156 is configured to prevent liquid fuel from entering the junction 124 when the liquefied gas fuel is being supplied to the junction 124 via the liquefied gas fuel subsystem 110, described above, and cause undesirable mixing and consumption of fuel.

Liquid fuel boosting means, preferably constituted by a supplementary fuel pump 158, or in other words a boost pump 158, may be used to elevate the pressure of the liquid fuel prior to the liquid fuel entering the junction 124. This may be particularly desirable when the fuel consuming mode is switched from the liquefied gas fuel consuming mode to the liquid fuel consuming mode, as discussed in greater detail below. The pressure increase provided by the supplementary fuel pump 158 in relation with the basic liquid fuel pressure of the liquid fuel supply may be within the range of between about 2 bar and about 10 (or higher) bar, or at least to a pressure above the vapor pressure of the liquefied gas fuel. A non-return valve 160 is configured to prevent liquefied gas fuel from entering the liquid fuel subsystem 150 and causing undesirable mixing and consumption of fuel.

As illustrated in FIG. 1, a controller 170 is in communication with the liquefied gas fuel pump 114, the lock-off valves 118, 122, the (temperature and) pressure sensor 128 (and any (temperature and) pressure sensor provided on the fuel tank 112), the lock-off valves 132, 156, and the supplementary fuel pump 158 and is configured to control whether the valves 118, 122, 132, 156 are in an open configuration or a closed configuration, and whether the pumps 114, 158 are on or off. The controller 170 receives data from the (temperature and) pressure sensor 128 (and optional temperature/pressure sensor provided on the fuel tank 112) and uses the data to control operation of the system via manipulation of the various valves and pumps that the controller 170 communicates with. The fuel pump 154 and the high pressure fuel pump 126 may also be in communication with the controller 170. The illustrated embodiment is not intended to be limiting in any way. A switch 196 is also in communication with the controller 170 and is located in a cabin of the vehicle so that an operator of the vehicle may use the switch 196 to switch between the fuel consuming modes of the system 100, as discussed in further detail below. Alternatively or in combination with said switch 196 the controller 170 may comprise a switch algorithm so as to switch between fuel consuming modes autonomously, i.e. based on for example measured values like fuel level in the fuel tanks.

Figure 2:
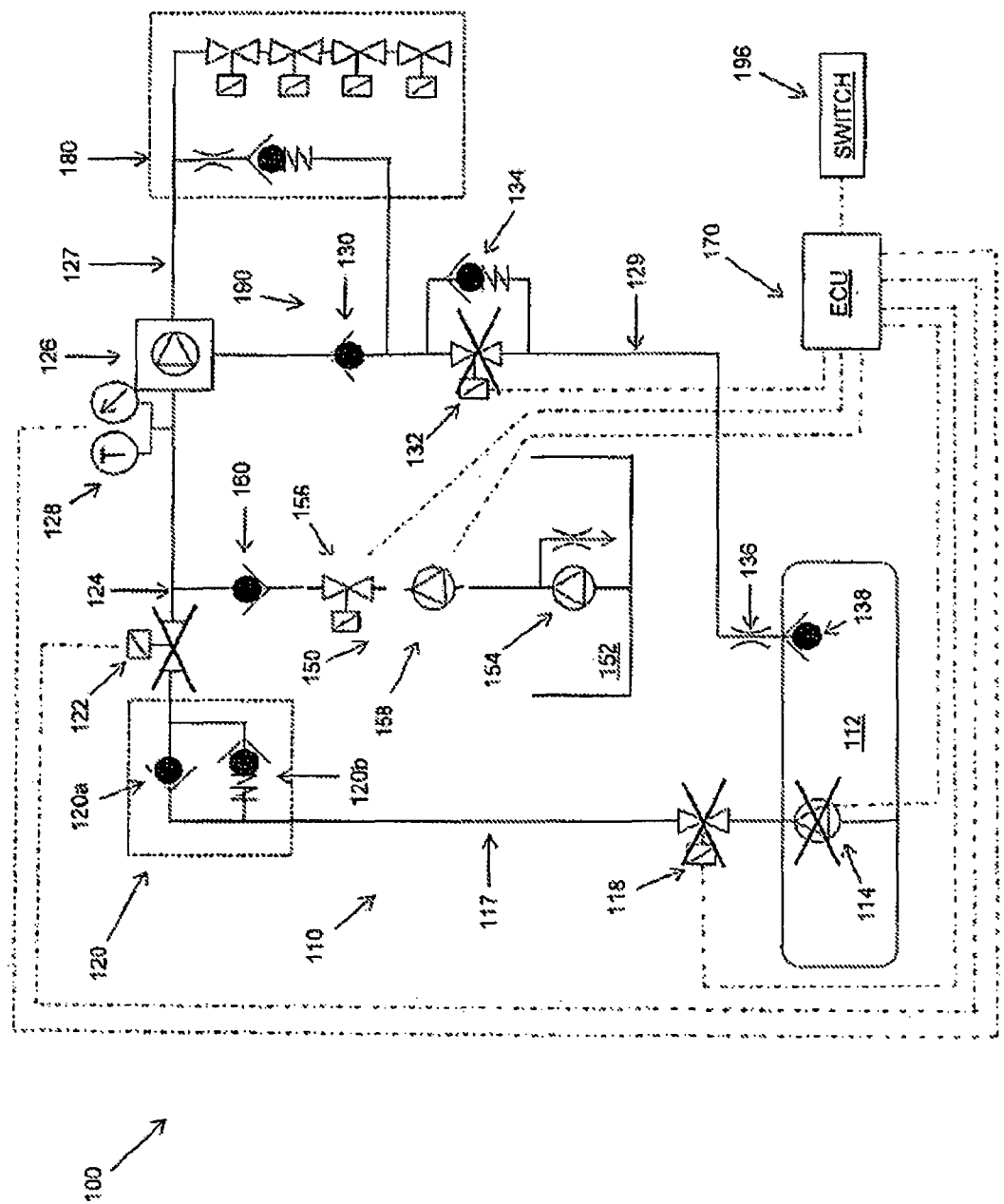
FIG. 2 illustrates the direct injection bi-fuel system of FIG. 1 in a liquid fuel operating mode.

FIG. 2 illustrates when the combustion engine is running on the liquid fuel, and the direct injection bi-fuel system 100 is operating in the liquid fuel consuming mode. As illustrated in FIG. 2, the fuel pump 154 is on so that the liquid fuel may be pumped from the fuel storage tank 152. The lock-off valves 118, 122, and 132 are in a closed configuration and the fuel pump 114 is off, as represented by the large X's over those components of the system 100. The non-return valve 160 is active to prevent any back flow of fuel from the junction 124 may not flow back into the liquid fuel subsystem 150. Any trapped liquefied gas or liquid fuel between the lock-off valve 122 and the non-return valve 120a will be relieved by the pressure limiting valve 120b. Any trapped liquefied gas or liquid fuel between the lock-off valve 132 and the non-return valve 130 will be relieved by the pressure limiting valve 134.

Figure 3:
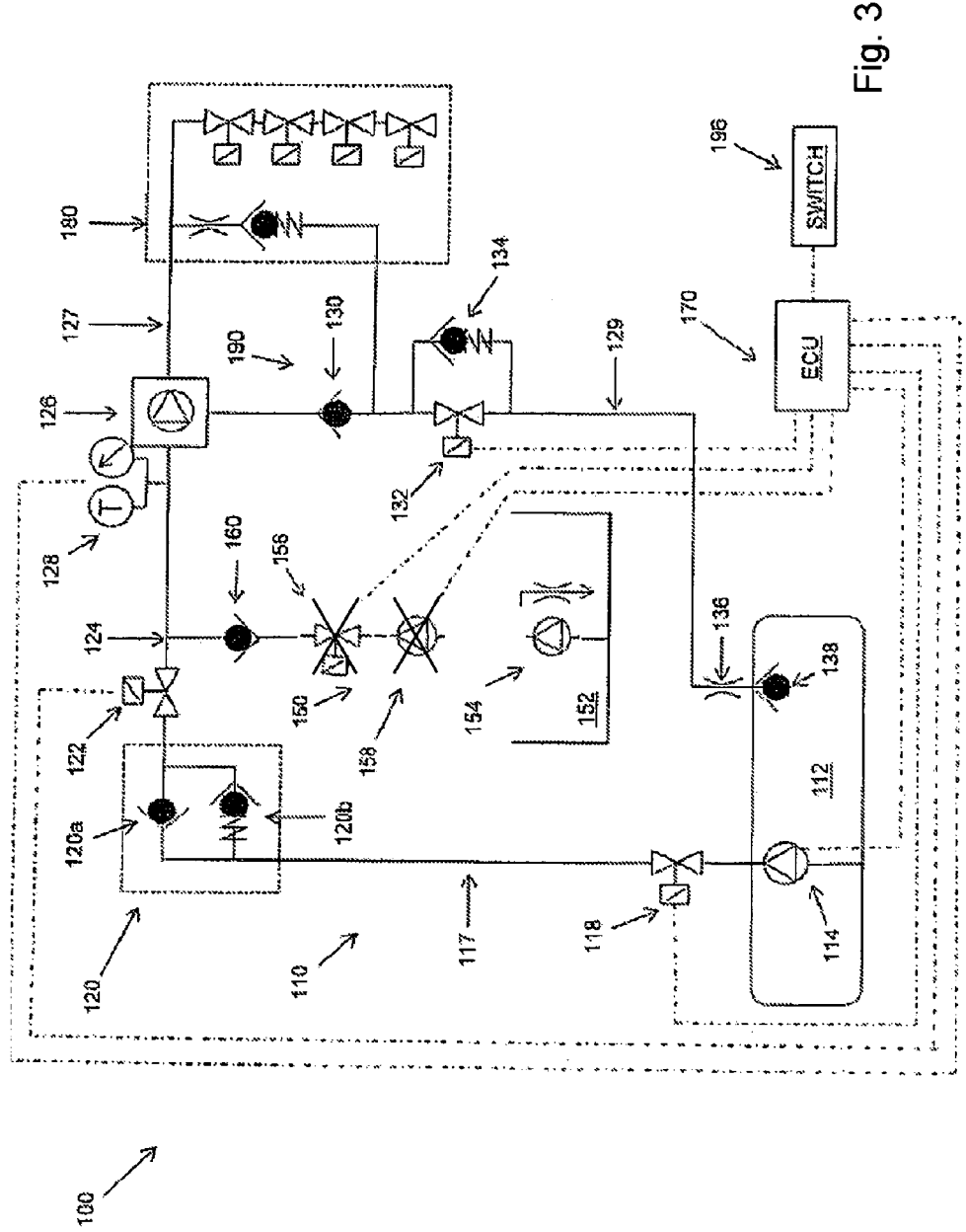
FIG. 3 illustrates the direct injection bi-fuel system of FIG. 1 in a liquefied gas fuel operating mode.

FIG. 3 illustrated when the combustion engine is running on liquefied gas fuel, and the direct injection bi-fuel system 100 is operating in the liquefied gas fuel consuming mode. As illustrated in FIG. 3, the fuel pump 114 is on so that the liquefied gas fuel may be pumped from the fuel storage tank 112. The lock-off valve 156 is in the closed configuration, and the supplementary fuel pump 158 is off, as represented by the large X's over those components of the system 100. The non-return valves 120, 130 and 138 are active. The controller 170 is configured to alter the operating parameters of the system 100 based on the liquefied gas fuel being used in such a manner that approximately 10-35% more fuel will be injected by the fuel injectors into the combustion engine. This increase in volume will result in stable and efficient behaviour of the combustion engine. Since lock-off valve 132 is open during the liquefied gas fuel consuming mode, liquefied gas fuel is circulated through the system.

When the combustion engine is operating on liquid fuel, and the direct injection bi-fuel system 100 is operating in the liquid fuel consuming mode, illustrated in FIG. 2, the operator of the vehicle can switch to the liquefied gas fuel consuming mode, illustrated in FIG. 3. To achieve this, the operator of the vehicle can operate the switch 196 that is located inside the cabin of the vehicle so that a signal is communicated to the controller 170. The controller 170 will coordinate the switching procedure.

Specifically, after operating the fuel selection switch 196 to select the liquefied gas fuel consuming mode, the fuel pump 114 will turn on, and the lock-off valves 118, 122, and 132 will be opened. In some situations, it may be necessary to activate the supplementary fuel pump 158, to decrease a pressure difference over the lock-off valve 122. After a delay, the lock-off valve 156 closes and the supplementary fuel pump 158 turns off. The purging action may result in, as a consequence, some amount of liquid fuel ending up in the fuel storage tank 112, which has been found to be acceptable. At this point in time, the fuel in the high pressure line 127 and the high pressure fuel rail 180 still consists of liquid fuel. The controller 170 is programmed to determine a decay factor on the value in which the controller 170 parameters, and resulting control of the various system components that are in communication with the controller, are altered. The decay factor is a function of fuel consumption and physical system parameters. After the decay is finalized, the fuel system 100 has completed its switch-over to liquefied gas fuel.

When the combustion engine is operating on liquefied gas fuel, and the direct injection bi-fuel system 100 is operating in the liquefied gas fuel consuming mode, illustrated in FIG. 3, the driver of the vehicle can switch to the liquid fuel consuming mode, illustrated in FIG. 2. To achieve this, the driver of the vehicle can operate the switch 196 that is located inside the cabin of the vehicle. The controller 170 will coordinate the switching procedure.

Specifically, after operating the fuel selection switch 196, the supplementary fuel pump 158 will turn on, the lock-off valve 156 will be opened, the lock-off valves 118, 122 will be closed (after some programmable delay), and the fuel pump 114 will be turned off. The supplementary fuel pump 158 is used to increase the pressure of the liquid fuel to about the pressure of the liquefied gas fuel that was being supplied to the high pressure fuel pump 126 so that the liquefied gas fuel may be flushed, or, purged, from the system 100 via the liquefied gas fuel return subsystem 190. After a delay, the lock-off valve 132 will close. The delay is dependent on physical system parameters. After a second delay, the supplementary fuel pump 158 will turn off. This second delay is a function of fuel consumption and physical system parameters. The fuel in the high pressure fuel line 127 and the high pressure rail still consists of liquefied gas fuel. The controller 170 is programmed to determine a decay factor on the value in which the controller 170 parameters, and resulting control of the various system components that are in communication with the controller, are altered. The decay factor is a function of fuel consumption and physical system parameters. After the decay is finalized, the fuel system 100 has completed its switch-over to the liquid fuel consuming mode.

In practice it appears that some residual gas fuel is still present in the system, i.e. in the fuel supply line to the high pressure pump, and the low pressure region of the high pressure pump, after the lock-off valve 132 is closed as described above. After a predetermined delay, preferably in the range of about 10 to 180 seconds from the above step of closing the lock-off valve 132 and while the supplementary fuel pump 158 is still switched on, the lock-off valve is opened again for a predetermined time to flush liquid fuel comprising any residual liquefied gas fuel from the fuel supply to the high pressure pump via the return fuel line. This proves to be a very effective way of removing residual liquefied gas fuel from the system during the liquid fuel consuming mode. As a consequence, some amount of liquid fuel ends up in the fuel storage tank 112, which has been found to be acceptable. The result of this method step is that any residual gas fuel is removed from the system in a highly effective manner and thereby the chance of occurrence of vapor lock resulting in stall of the engine is decreased significantly. At the same time or shortly after closing the lock-off valve 132 (the return valve) again, the supplementary fuel pump 158 is switched off as described above.

Figure 4:
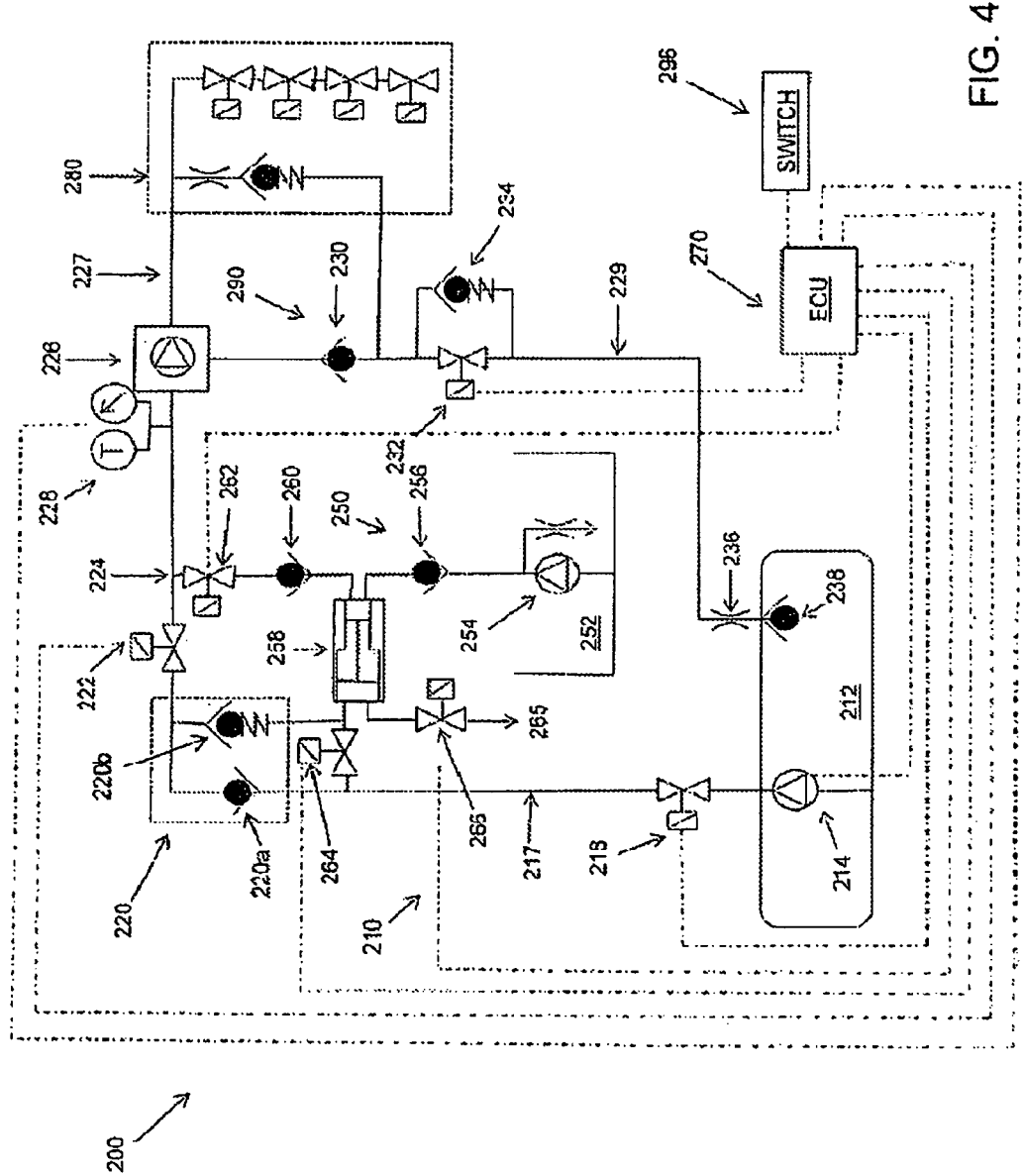
FIG. 4 illustrates another embodiment of a direct injection bi-fuel system for a combustion engine.

Because the high pressure fuel pump 126 and the high pressure fuel rail are used for the liquid fuel as well as for the liquefied gas fuel, the internal combustion engine will start on the fuel last used. In a hot engine, conditions starting on liquefied gas fuel may cause vapor lock problems in some applications. In those applications, a switch-over may take place during the starting of the engine. FIG. 4 illustrates a direct injection bi-fuel system 200 for a combustion engine according to an embodiment of the invention. Similar to the direct injection bi-fuel system 100 described above, the direct injection bi-fuel system 200 of FIG. 4 is configured to switch between two types of fuel being provided to the combustion engine. One of the fuels is a liquid fuel, such as petrol, diesel, or gasoline, and the other fuel is a liquefied gas fuel, such as a liquefied petroleum gas ("LPG"), which may include propane or butane or mixtures thereof.

As illustrated in FIG. 4, the direct injection bi-fuel system 200 includes a liquefied gas fuel subsystem 210 and a liquid fuel subsystem 250, as well as high pressure components that are located between the subsystems 210, 250 and the combustion engine, as described in further detail below. One of the differences between the direct injection bi-fuel system 200 described below and the direct injection bi-fuel system 100 described above is the inclusion of liquid fuel boosting means constituted by a purging unit 258 in place of the supplementary fuel pump 158. As discussed in further detail below, the purging unit 258 is placed parallel with the liquefied gas fuel subsystem 210 and the liquid fuel subsystem 250, and is configured to replace the liquefied gas fuel in the fuel system 200 with the liquid fuel by means of a purging action.

As illustrated in FIG. 4, the liquefied gas fuel subsystem 210 includes a fuel storage tank 212 configured to hold a supply of a liquefied gas vapor fuel, such as LPG. In an embodiment, the pressure of the liquefied gas fuel in the fuel storage tank 212 may be about 2-16 bar. A fuel pump 214 is mounted in the fuel storage tank 212. The fuel pump 214 may be of any suitable type of fuel pump that can be configured to remove the liquefied gas fuel from the fuel storage tank 212 via suction and pump the liquefied gas fuel under an elevated pressure thorough a fuel supply line 217, through a safety lock-off valve 218, through a pressure limiting non-return valve 220, through a lock-off valve 222, through a junction 224, and to a high pressure fuel pump 226.

The pressure limiting non-return valve 220 is depicted in FIG. 4 as having a non-return valve 220a and a pressure limiting valve 220b. The non-return valve 220a and the pressure limiting valve 220b may be part of a single integrated valve that performs the functions of a non-return valve and a pressure limiting valve and therefore may together be called a pressure limiting non-return valve 220. The non-return valve 220a is configured to prevent liquid fuel from entering the liquefied gas fuel subsystem 210, and the pressure limiting valve 220b is configured to limit the differential system pressure between the lock-off valve 222 and the non-return valve 220a.

The lock-off valve 222 is configured to prevent liquefied gas fuel from entering the liquid fuel system 250, which may cause undesired mixing and consumption of fuel. The junction 224 joins the liquefied gas fuel subsystem 210 and the liquid fuel subsystem 250 so that the liquefied gas fuel and the liquid fuel may be individually supplied to the high pressure fuel pump 226. In between the junction 224 and the high pressure fuel pump 226 is a combined pressure and temperature sensor 228 that is configured to measure the temperature and the pressure of the fuel being supplied to the high pressure fuel pump 226.

The high pressure fuel pump 226 is connected to a high pressure fuel line 227 and is configured to pump the fuel, whether the fuel is liquid fuel or liquefied gas fuel, at an elevated pressure to a high pressure fuel rail and fuel injectors, collectively designated as 280 in FIG. 4, of a direct injection combustion engine. The pressure of the fuel in the high pressure rail may be in the range of about 20 bar to about 200 bar. Although FIG. 4 schematically illustrates a four cylinder combustion engine configuration, the engine may include additional cylinders, high pressure pumps, electronic control units, etc. The illustrated embodiment is not intended to be limiting in any way.

A liquefied gas fuel return subsystem 290 is connected to the high pressure fuel rail and to the high pressure fuel pump 226 and is configured to provide a return path for the liquefied gas fuel to the fuel storage tank 212 in the event that pressure relief for the high pressure fuel rail 280 or the high pressure fuel pump 226 is needed, to remove vapor bubbles, as needed, and/or to cool down the temperature of the supply of the liquefied gas fuel. The liquefied gas fuel return subsystem 290 includes a non-return valve 230 that is configured to prevent liquefied gas fuel from entering the high pressure fuel pump 226 by a return fuel line 229, and a return valve in the form of a lock-off valve 232 that is configured to prevent liquid fuel from entering the liquefied gas fuel subsystem 210 when the liquid fuel is being supplied to the combustion engine, which may cause undesirable mixing and consumption of fuel. A pressure limiting valve 234 is configured to limit the differential system pressure between the lock-off valve 232 and the non-return valve 230.

Any liquefied gas fuel that is returned from the high pressure components of the system, such as the high pressure fuel pump 226 and the high pressure fuel rail, flows through the return fuel line 229, through a restriction 236, through a non-return valve and into the fuel storage tank 212, as illustrated in FIG. 4. The pressure of the liquefied gas fuel that is returned to the fuel storage tank is typically in between the pressure of the liquefied gas fuel in the fuel storage tank 212 and the pressure of the liquefied gas fuel that is supplied from the high pressure fuel pump 226 to the high pressure fuel rail and injectors 280.

A non-return valve 238 is provided at the fuel storage tank 212 and is configured to prevent fuel leakage in case of damage to the liquefied gas fuel subsystem 210. The restriction 236 is configured to control the elevated system pressure by the flow through the fuel pump 214. The pressure increase in relation with the fuel storage tank 212 may be within the range of between about 2 bar and about 10 bar.

The liquid fuel subsystem 250 includes a fuel storage tank 252 configured to hold a supply of a liquid fuel such as gasoline, petrol or diesel. A fuel pump unit 254 is mounted in the fuel storage tank 252 and is configured to remove the liquid fuel from the fuel storage tank 252 via suction and pump the liquid fuel through a non-return valve 256 an to the purging unit 258. The non-return valve 256 is configured to prevent the liquid fuel from running back into the fuel tank 212 during a purging action of the purging unit 258. A non-return valve 260 is configured to prevent liquefied gas fuel from entering the liquid fuel subsystem 250, which may cause unwanted mixing and consumption of fuel. A lock-off valve 262 is configured to prevent liquid fuel from entering the liquefied gas fuel subsystem 210, which may cause unwanted mixing and consumption of fuel.

The purging unit 258 is placed parallel with the liquefied gas fuel subsystem 210 and the liquid fuel subsystem 250. The purging unit 258 includes a piston 258a that is configured to create a pressure increase in the liquid fuel to create a purging action of the fuel. The liquefied gas fuel side of the purging unit 258 is connected to the supply fuel line 217 via a lock-off valve 264. A second lock-off valve 266 is connected to the liquefied gas fuel side of the purging unit 258 and is configured to slowly relieve the pressure of the purging unit 258 after the purging action of the purging unit 258 has been completed. The relieved liquefied gas fuel may be purged in an intake manifold or in a liquid fuel breather system, represented by 265 in FIG. 4.

The pressure increase provided by the purging unit 258 is related to the pressure in the liquefied gas fuel supply line 217, which is higher than the pressure of the liquid fuel after the fuel pump 254 and the physical parameters of the purging unit 258. The operation of the purging unit 258 is discussed in further detail below with respect to the switching of the direct injection bi-fuel system 200 from the liquefied gas fuel consuming mode to the liquid fuel consuming mode.

As illustrated in FIG. 4, a controller 270 is in communication with the liquefied gas fuel pump 214, the lock-off valves 218, 222, 232, 262, 264, 266, and the (temperature and) pressure sensor 228, and is configured to control whether the valves 218, 222, 232, 262, 264, 266 are in an open configuration or a closed configuration, and whether the pump 214 is on or off. The controller 270 receives data from the (temperature and) pressure sensor 228 and uses the data to control operation of the system via manipulation of the various valves and pumps that the controller 270 communicates with. The fuel pump 254 and the high pressure fuel pump 226 may also be in communication with the controller 270. The illustrated embodiment is not intended to be limiting in any way. A switch 296 is also in communication with the controller 270 and is located in a cabin of the vehicle so that an operator of the vehicle may use the switch 296 to switch between the fuel consuming modes of the system 200, as discussed in further detail below.

Figure 5:
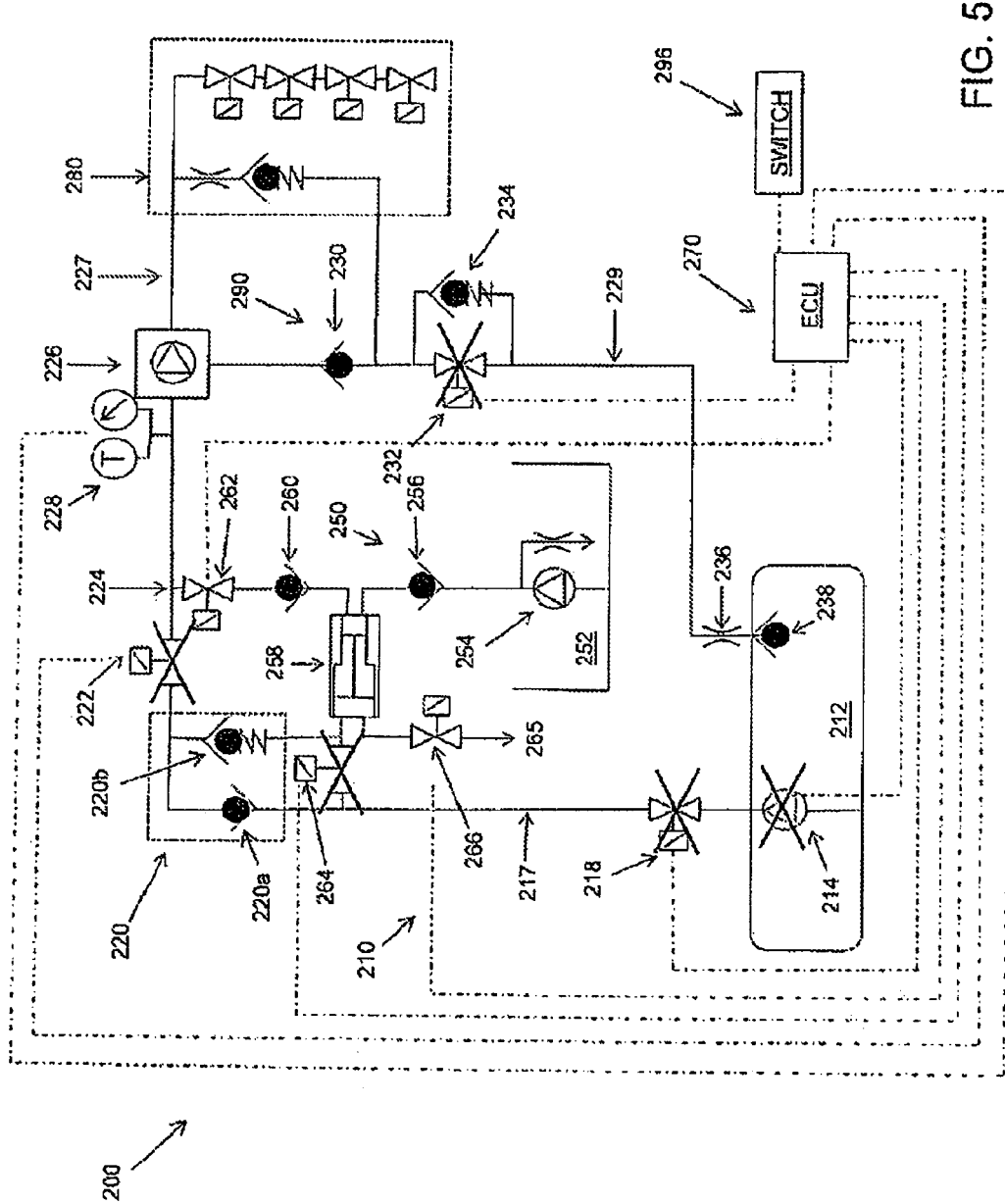
FIG. 5 illustrates the direct injection bi-fuel system of FIG. 4 in a liquid fuel operating mode.

FIG. 5 illustrates when the combustion engine is running on the liquid fuel, and the direct injection bi-fuel system 200 is operating in the liquid fuel consuming mode. As illustrated in FIG. 5, the fuel pump 254 is on, the lock-off valves 218, 222, 264, and 232 are in a closed configuration and the fuel pump 214 is off, as represented by the large X's over those components of the system 200. The non-return valves 256 and 260 are active. Any trapped liquefied gas or liquid fuel in between the lock-off valve 222 and the non-return valve 220a is relieved by the pressure limiting valve 220b. Any trapped liquefied gas fuel or liquid fuel between the lock-off valve 232 and the non-return valve 230 is relieved by the pressure limiting valve 234.

Figure 6:
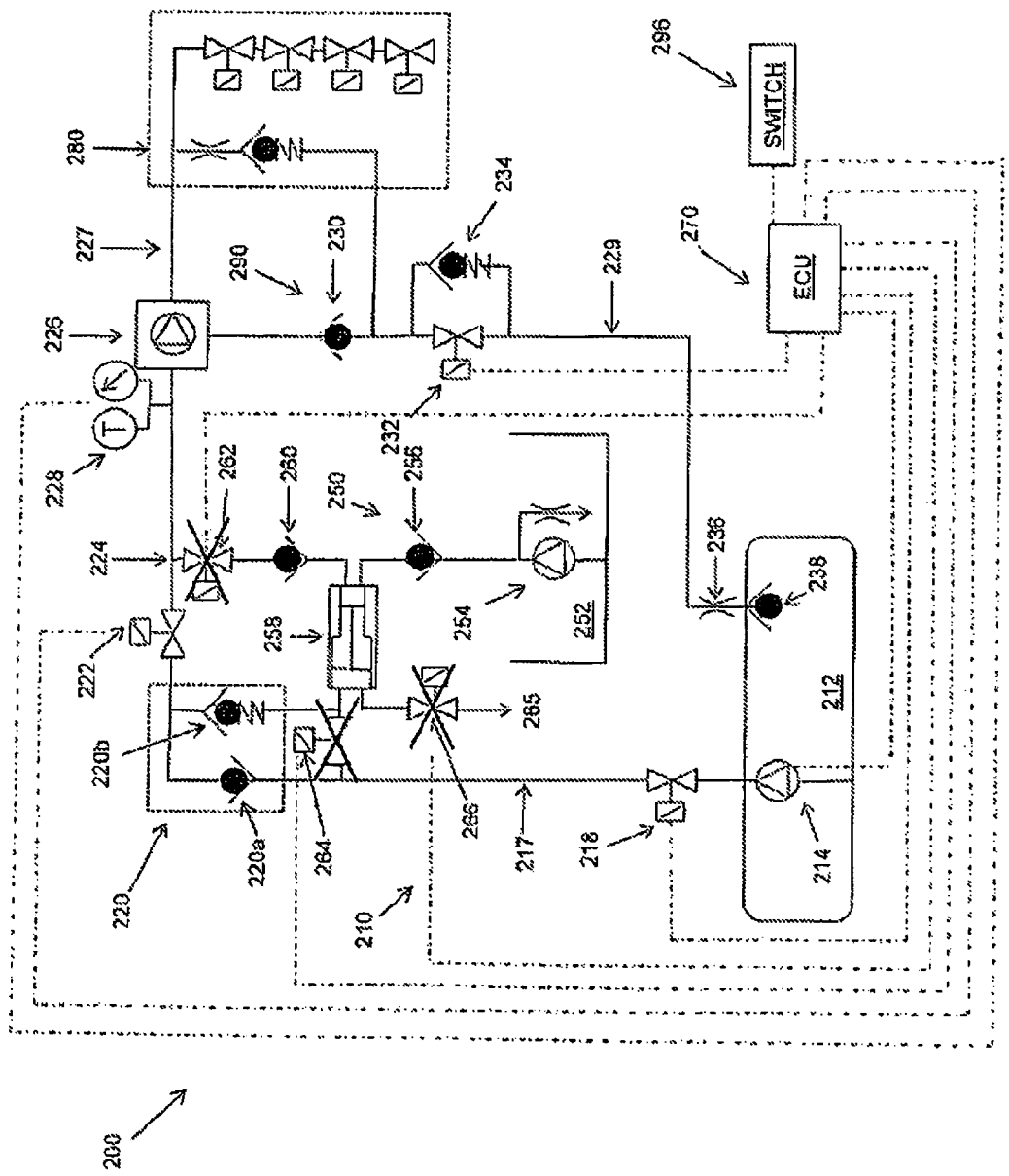
FIG. 6 illustrates the direct injection bi-fuel system of FIG. 4 in a liquefied gas fuel operating mode.

FIG. 6 illustrates when the combustion engine is running on the liquefied gas fuel, and the direct injection bi-fuel system 200 is operating in the liquefied gas fuel consuming mode. As illustrated in FIG. 6, the fuel pump 214 is on, the lock-off valve 262, 264, and 266 are in a closed configuration. The non-return valves 220a, 230, and 238 are active. The controller 270 is configured to alter the operating parameters of the system 200 based on the liquefied gas fuel being used in such a manner that approximately 10 to 35% more fuel will be injected by the fuel injectors into the combustion engine. This increase in volume will result in stable and efficient behavior of the combustion engine.

When the combustion engine is running on liquid fuel, and the direct injection bi-fuel system 200 is operating in the liquid fuel consuming mode, illustrated in FIG. 5, an operator of the vehicle can switch to the liquefied gas fuel consuming mode, illustrated in FIG. 6, if desired. To achieve this, the operator of a vehicle can operate the switch 296 that is located inside the cabin of the vehicle so that a signal is communication to the controller 270. The controller 270 will coordinate the switching procedure. Alternatively or in combination with said switch 296 the controller 270 may comprise a switch algorithm so as to switch between fuel consuming modes autonomously, i.e. based on for example measured values like fuel level in the fuel tanks.

Specifically, after operating the fuel selection switch 296 to select the liquefied gas fuel consuming mode, the fuel pump 214 will turn on, and the lock-off valves 218, 222, and 232 will be opened. In some situations, it may be necessary to temporarily activate the purging unit 258 by opening the lock-off valve 264, to decrease the pressure difference over lock-off valve 222. After a delay, the lock-off valve 262 closes, and optionally the purging unit 258 turns off by closing the lock-off valve 264. The purging action may cause, as a consequence, an amount of liquid fuel to end up in the fuel storage tank 212. The fuel in the high pressure rail 280 still consists of liquid fuel. The controller 270 is programmed to determine a decay factor on the value in which the controller 270 parameters, and resulting control of the various system components that are in communication with the controller, are altered. The decay factor is a function of fuel consumption and physical system parameters. After the decay is finalized, the fuel system 200 has completed its switch-over to liquefied gas fuel.

When the combustion engine is operating on the liquefied gas fuel, and the direct injection bi-fuel system 200 is operating in the liquefied gas fuel consuming mode, illustrated in FIG. 6, the operator of the vehicle can switch to the liquid fuel consuming mode, illustrated in FIG. 5, if desired. To achieve this, the operator of the vehicle can operate the fuel selection switch 296 that is located inside the cabin of the vehicle so that a signal is communication to the controller 270. The controller 270 will coordinate the switching procedure.

Figure 7:
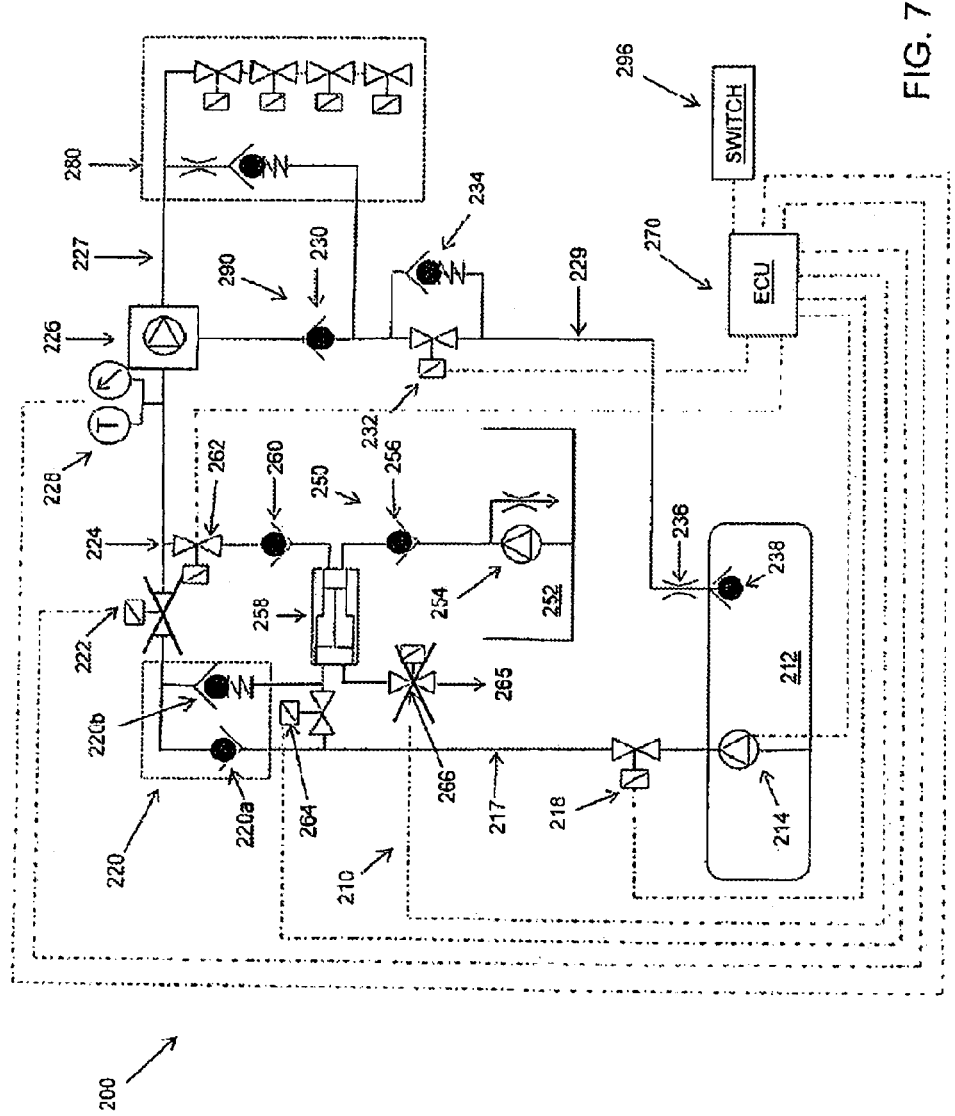
FIG. 7 illustrates the direct injection bi-fuel system of FIG. 4 when the system is being switched from the liquefied gas fuel operating mode of FIG. 6 and the liquid fuel operating mode of FIG. 5.

As illustrated in FIG. 7, after the fuel selection switch 296 is operated to select the liquid fuel consuming mode, the lock-off valve 264 will open and lock-off valve 266 will be closed so that the purging unit 258 (with the liquid fuel in the right chamber of the purging unit 258) may be pressurized by the higher pressure liquefied gas fuel. For example, the liquefied gas fuel may have a pressure of about 10-20 bar as it enters the purging unit 258. Since the fuel pump 254 is on, the liquid fuel may be supplied to the purging unit 258 at a pressure of about 6 bar, for example. The lock-off valve 222 will close, and the lock-off valve 262 will open to start the purging action. The lock-off valves 222, 262 close and open after some programmable delay. Because the pressure within the purging unit 258 is higher on the liquefied gas fuel side of the piston 258a, the piston 258a will move towards the liquid fuel side of the purging unit and will increase the pressure of the liquid fuel equal to or above the vapor pressure of the liquefied gas fuel, for example 15 bar, depending on the pressure and temperature of the liquefied gas fuel in the storage unit 212, the chemical composition of the liquefied gas fuel. This increase in pressure of the liquid fuel allows the liquid fuel to purge the liquefied gas fuel out of the junction 224 and the high pressure fuel pump 226.

After a delay, which is dependent on physical system parameters and fuel consumption, the purging action has been completed. The lock-off valves 218, 264, and 232 will be closed, and the fuel pump 214 will be turned off. After a predetermined delay, preferably in the range of about 10 to 180 seconds from the above step of closing the lock-off valve 232 and while the purging unit is still active, the lock-off valve 232 is opened again for a predetermined time, preferably of about 1 to 10 seconds, to flush liquid fuel comprising any residual liquefied gas fuel from the fuel supply to the high pressure pump via the return fuel line. Subsequently, by opening the lock-off valve 266, the purging unit 258 may be reset to its starting configuration by allowing the pressure on the liquefied gas fuel side of the piston 258a to be slowly reduced to about 0 bar. The liquid fuel side of the piston 258a will reduce to the normal pressure of the liquid fuel, for example 6 bar.

Just after the flush action has been completed, the fuel in the high pressure rail 280 still consists of liquefied gas fuel. The controller 270 is programmed to determine a decay factor on the value in which the controller 270 parameters, and resulting control of the various system components that are in communication with the controller, are altered. The decay factor is a function of fuel consumption and physical system parameters. After the decay is finalized, the fuel system 200 has completed its switch-over to the liquid fuel consuming mode. The controller 270 determines a decay factor on the value in which the parameters of the controller 270 are altered. The decay factor is a function of fuel consumption and physical system parameters. After the decay is finalized and the liquid fuel has completely replaced the liquefied gas fuel in the high pressure fuel rail, the fuel system 200 has completed its switch-over.

While specific embodiments of the invention have been described above, it will be appreciated that the invention may be practiced otherwise than as described. The descriptions above are intended to be illustrative, not limiting. Thus, it will be apparent to one skilled in the art that modifications may be made to the invention as described without departing from the scope of the claims set out below.

The invention claimed is:

1. A method of switching from a liquefied gas fuel being provided to a direct injection combustion engine during a liquefied gas fuel consuming mode, to a liquid fuel being provided to the engine during a liquid fuel consuming mode, the method comprising the steps of:
   a) pumping a liquefied gas fuel by means of a liquefied gas fuel pump to a high pressure pump which is configured to pump liquefied gas fuel to a high pressure rail of the direct injection combustion engine during the liquefied gas fuel consuming mode;
   b) switching from the liquefied gas fuel consuming mode to the liquid fuel consuming mode;
   c) pumping a liquid fuel at a pressure at least equal to the vapor pressure of the liquefied gas fuel to the high pressure pump, by means of at least a first liquid fuel pump, wherein liquefied gas fuel is flushed via a return fuel line between the high pressure pump and a fuel tank;
   d) stop pumping liquefied gas fuel to the high pressure pump;
   e) stop flushing liquefied gas fuel by closing a return valve in the return fuel line;
   f) after a predetermined delay after step e) and during the liquid fuel consuming mode, opening the return valve for a predetermined time to flush liquid fuel comprising any residual liquefied gas fuel via the return fuel line; and
   g) decreasing the pressure of the liquid fuel pumped to the high pressure pump to a pressure lower than the vapor pressure of the liquefied gas fuel.

2. The method according to claim 1, wherein step c) is effected by feeding a liquid fuel by means of the first liquid fuel pump to liquid fuel boosting means, by increasing the pressure of the liquid fuel supplied by the first liquid fuel pump to the boosting means to a pressure at least equal to the vapor pressure of the liquefied gas fuel, and by feeding the liquid fuel at the increased pressure to the high pressure pump with the boosting means.

3. The method according to claim 2, wherein the boosting means are constituted by a boost pump for liquid fuel.

4. The method according to claim 2, wherein step f) is effected by deactivating the boosting means at least to an extent sufficient for pumping the liquid fuel at the decreased pressure to the high pressure pump.

5. The method according to claim 4, wherein step g) is carried out simultaneously with the closing of the return valve at the end of step f).

6. The method according to claim 1, wherein step e) is carried out from 1 to 30 seconds, after step d).

7. A method according to claim 1, wherein the predetermined delay in step f) is in the range from 1 to 180 seconds.

8. The method according to claim 1, wherein the predetermined delay in step f) is dependent upon the fuel consumption of the engine.

9. The method according to claim 1, wherein the predetermined time in step f) is in the range from 1 to 10 seconds.

10. The method according to claim 1, wherein the return fuel line is between the high pressure pump and a fuel tank for the liquefied gas fuel.

11. A direct injection bi-fuel system configured to switch between supplying liquefied gas fuel to an engine during a liquefied gas fuel consuming mode and liquid fuel to the engine during a liquid fuel consuming mode, the system comprising:
   a liquefied gas fuel pump configured to pump the liquefied gas fuel to a high pressure pump configured to pump the liquefied gas fuel to a high pressure rail of the engine during the liquefied gas fuel consuming mode;
   a switch configured to switch between the liquefied gas fuel consuming mode and the liquid fuel consuming mode;
   a return line for flushing the liquified gas fuel from the high pressure pump to a fuel tank; and
   a valve for controlling flow through the return line.

12. The method according to claim 1, wherein step e) is carried out from 5 to 10 seconds after step d).

* * * * *